(12) United States Patent
Ploechinger

(10) Patent No.: US 8,047,711 B2
(45) Date of Patent: Nov. 1, 2011

(54) THERMOCOUPLE VACUUM GAUGE

(75) Inventor: Heinz Ploechinger, Freinberg (AT)

(73) Assignee: Heinz Ploechinger, Freinberg ( * ) Notice: Subject to any disclaimer, the term of this patent is extended or adjusted under 35 U.S.C. 154(b) by 756 days.

(21) Appl. No.: 12/221,679

(22) Filed: Aug. 6, 2008

(65) Prior Publication Data
US 2010/0034236 A1    Feb. 11, 2010

(51) Int. Cl.
G01L 21/14    (2006.01)
(52) U.S. Cl. .................................. 374/141; 374/45
(58) Field of Classification Search ............ 374/45, 374/141, 178, 179, 164
See application file for complete search history.

(56) References Cited

U.S. PATENT DOCUMENTS

| | | | | |
|---|---|---|---|---|
| 4,577,979 A | * | 3/1986 | Kalnin et al. | 374/178 |
| 4,579,002 A | * | 4/1986 | Zettler | 374/179 |
| 4,633,717 A | * | 1/1987 | Scholl | 374/164 |
| 5,351,551 A | * | 10/1994 | Drubetsky et al. | 374/45 |
| 6,727,709 B2 | * | 4/2004 | Jeong et al. | 324/610 |
| 7,421,905 B2 | * | 9/2008 | Zerwekh et al. | 374/E11.016 |
| 2002/0163345 A1 | | 11/2002 | Jeong et al. | |
| 2007/0006663 A1 | * | 1/2007 | Zerwekh et al. | 73/800 |
| 2010/0034236 A1 | * | 2/2010 | Ploechinger | 374/45 |

FOREIGN PATENT DOCUMENTS

DE    249 534 A1    9/1987
EP    1409963 B1    12/2007

OTHER PUBLICATIONS

Teledyne Hastings Instruments, Instruction Manual VT/CVT Series Vacuum Gauges and Controllers, Section 3.6, p. 14.

* cited by examiner

Primary Examiner — Yaritza Guadalupe-McCall

(57) ABSTRACT

A thermocouple vacuum sensor is provided, the thermocouple being surrounded by a gas or mixture of gases the pressure of which is to be measured. Cyclically the thermocouple is heated until its temperature reaches an upper temperature threshold. The thermocouple is subsequently cooled until its temperature reaches a lower temperature threshold. The heating time required to heat the thermocouple from the lower to the upper temperature threshold is measured. The cooling time required to cool the thermocouple from the upper temperature threshold to the lower temperature threshold may also be measured. The pressure surrounding the thermocouple may then be determined as a function of either the heating time, or the cooling time, or both.

15 Claims, 4 Drawing Sheets

THERMOCOUPLE VACUUM GAUGE

TECHNICAL FIELD

The present invention generally relates to a thermocouple apparatus to measure pressures in a partial vacuum, and more particularly, to a thermocouple apparatus using a time-measurement operating method to measure pressure over a wide range.

BACKGROUND OF THE INVENTION

Thermocouple measuring tubes are known in the art to measure pressure in a partial vacuum. A change in pressure in the measuring tube changes the molecular collision rate and therefore the thermal conduction of the gas or gas mixture surrounding the thermocouple. Such measuring tubes are typically operated using one of two alternative operating methods.

In a first operating method, an alternating voltage is continuously applied to the thermocouple, thereby heating the thermocouple. The resulting temperature shift depends on the pressure of the surrounding gas or gas mixture and causes a change in the thermocouple's DC output inversely with pressure changes. Unfortunately this operating method can only be used within a relatively small pressure measurement range. Examples utilizing this operating method are DV-4 and DV-6 thermocouple vacuum gauge tubes manufactured by Teledyne Hastings.

In a second operating method, the thermocouple's temperature is electronically controlled to maintain a predetermined temperature by continuously adjusting the electrical power applied to the thermocouple. The amount of power applied to the thermocouple is evaluated and used as a measure for the pressure of the partial vacuum. This operating method extends the measurement range of pressures in a vacuum, but not by much.

U.S. Pat. No. 4,579,002, hereby incorporated by reference thereto in its entirety, describes an operating method, in which a pulsed heating current is supplied to the thermocouple. In the "off" periods of the heating pulse the generated thermoelectric voltage (EMF) is measured using an amplifier. A comparator compares the measured, amplified thermoelectric voltage to a set-point value. If the amplified EMF deviates from the set-point value, the length of the heating pulse is adjusted to move the amplified EMF towards the set-point value. This maintains a constant temperature at the thermocouple while operated.

A similar method is described in U.S. Pat. No. 5,351,551, in which the constant temperature at the thermocouple is maintained by controlling the current of the heating pulse. U.S. Pat. No. 5,351,551 is hereby incorporated by reference thereto in its entirety.

U.S. Pat. No. 6,727,709, hereby incorporated by reference thereto in its entirety, describes a thermal conduction vacuum gauge using a Peltier tip. The Peltier tip is part of a measuring bridge in a vacuum chamber. The measuring bridge may be operated at constant power or at constant temperature. A voltage signal obtained from the measuring bridge is a measure of the pressure.

DD 249 534 A1 describes a method and a system for measuring the pressure of gases. The partial vacuum is measured by use of a current-carrying electrical measuring resistor whose resistance changes with temperature. The measuring resistor is heated by high-voltage pulses. During the "off" periods of the heating pulse, low voltage is applied to the measuring resistor in order to determine its resistance upon cooling. The cooling time following a heating pulse is used as a measure of the pressure. A disadvantage is that the low voltage applied during cooling influences the cooling time.

EP 1 409 963 B1 by the same applicant, which is hereby incorporated by reference thereto in its entirety, describes sensors and methods for detecting measurement variables and physical parameters. Sensors, for example Pirani measuring elements, whose electrical resistance changes as the result of current flow and the associated temperature increase, are supplied with electrical pulses. The amplitude of these pulses is changed over time according to a mathematical function.

During a measuring cycle the voltage of the pulses may, for example, be increased linearly over time. Correspondingly, the power to the sensor measuring element increases quadratically over time. For a Pirani gauge operated in this manner, the time required to reach a specified temperature threshold value is used as a measure of the pressure. Since time can be measured very precisely at low cost, this method has major advantages, such as extension of the measurement range, greater accuracy, and low power consumption. The described operating method is used in model VSP-62 Pirani vacuum gauges manufactured by Thyracont Vacuum Instruments GmbH.

However, the described vacuum gauges only evaluate the time required to reach a specified temperature during heating. The cooling time is not evaluated, since measuring the resistance of the Pirani element requires applying a measuring voltage, which interferes with the cooling of the element.

Therefore, in light of the problems associated with existing approaches, there is a need for improved systems and methods for accurately measuring pressures in a vacuum over a wide range.

SUMMARY OF THE INVENTION

In one aspect of the present invention a thermocouple vacuum sensor is provided, the thermocouple being surrounded by a gas or mixture of gases the pressure of which is to be measured. Cyclically the thermocouple is heated until its temperature reaches an upper temperature threshold. It is subsequently cooled until its temperature reaches a lower temperature threshold. The temperature of the thermocouple may be determined in a voltage sensing electronic circuit by evaluating the thermoelectric voltage generated by the thermocouple. The heating time required to heat the thermocouple from the lower to the upper temperature threshold may be measured. The cooling time required to cool the thermocouple from the upper temperature threshold to the lower temperature threshold may also be measured. The pressure surrounding the thermocouple may then be determined as a function of either the heating time, or the cooling time, or both.

In a further aspect of the invention the measurement range of the thermocouple vacuum sensor may be significantly extended. This may be achieved by utilizing the effect that both heat capacity and thermal conductivity of the gas surrounding the thermocouple determine the heating and cooling time. The extension of the measurement range at higher pressures is based on the increasing influence of the heat capacity of a gas, which changes with pressure at the upper measurement range. To evaluate heat capacity at high pressure a high amount of heating energy is required for the thermocouple to be heated from its lower threshold temperature to its upper threshold temperature at the upper end of the measuring range.

As both thermal conductivity and heat capacity decrease with pressure only a small amount of heating energy is required for the thermocouple to be heated from its lower threshold temperature to its upper threshold temperature at the lower end of the measuring range. To increase the sensor's sensitivity at low pressure the power applied to the thermocouple may be reduced. The reduced power increases the heating time, thereby improving the sensor's resolution and extending its measurement range at low pressure.

In yet another aspect of the invention variable heating power may be applied to the thermocouple from an electronic heating circuit during a measuring cycle. To increase sensitivity at low pressure while maintaining the ability to measure high pressure the heating power applied to the thermocouple during the heating phase may increase over time until the upper temperature threshold is reached. The increase in power may be achieved by increasing the voltage of heating pulses applied to the thermocouple with a constant duty cycle, or by increasing the duty cycle of heating pulses having a constant voltage, or by a combination thereof.

At low pressure a small amount of electrical energy is sufficient to heat the thermocouple from the lower to the upper temperature threshold. Ramping up the power applied to the thermocouple over time causes the time to collect the necessary energy to reach the upper temperature threshold to increase. For a given time resolution of the time measuring device, this "time extension" may be used to achieve better resolution for the partial vacuum at lower pressure ranges.

In contrast to operating methods which maintain a constant high temperature of the thermocouple, the variable temperature operating method according to one aspect of the invention operates at high temperature only during short periods of time at the end of a measuring cycle. The average temperature of and average power applied to the thermocouple utilizing a variable temperature operating method may be significantly lower than those of a thermocouple operating at constant temperature. This is advantageous especially when measuring pressure of small gas volumes, for example in analytical instruments, to limit the power applied to the gas and thereby the influence that measuring its pressure has on the gas in the probe.

The following detailed description of the invention is merely exemplary in nature and is not intended to limit the invention or the application and uses of the invention. Furthermore, there is no intention to be bound by any theory presented in the preceding background of the invention or the following detailed description of the invention.

BRIEF DESCRIPTION OF THE DRAWINGS

FIG. 2a illustrates a temperature profile at higher pressure.

FIG. 2b illustrates a temperature profile at low pressure.

DETAILED DESCRIPTION

Figure 1:
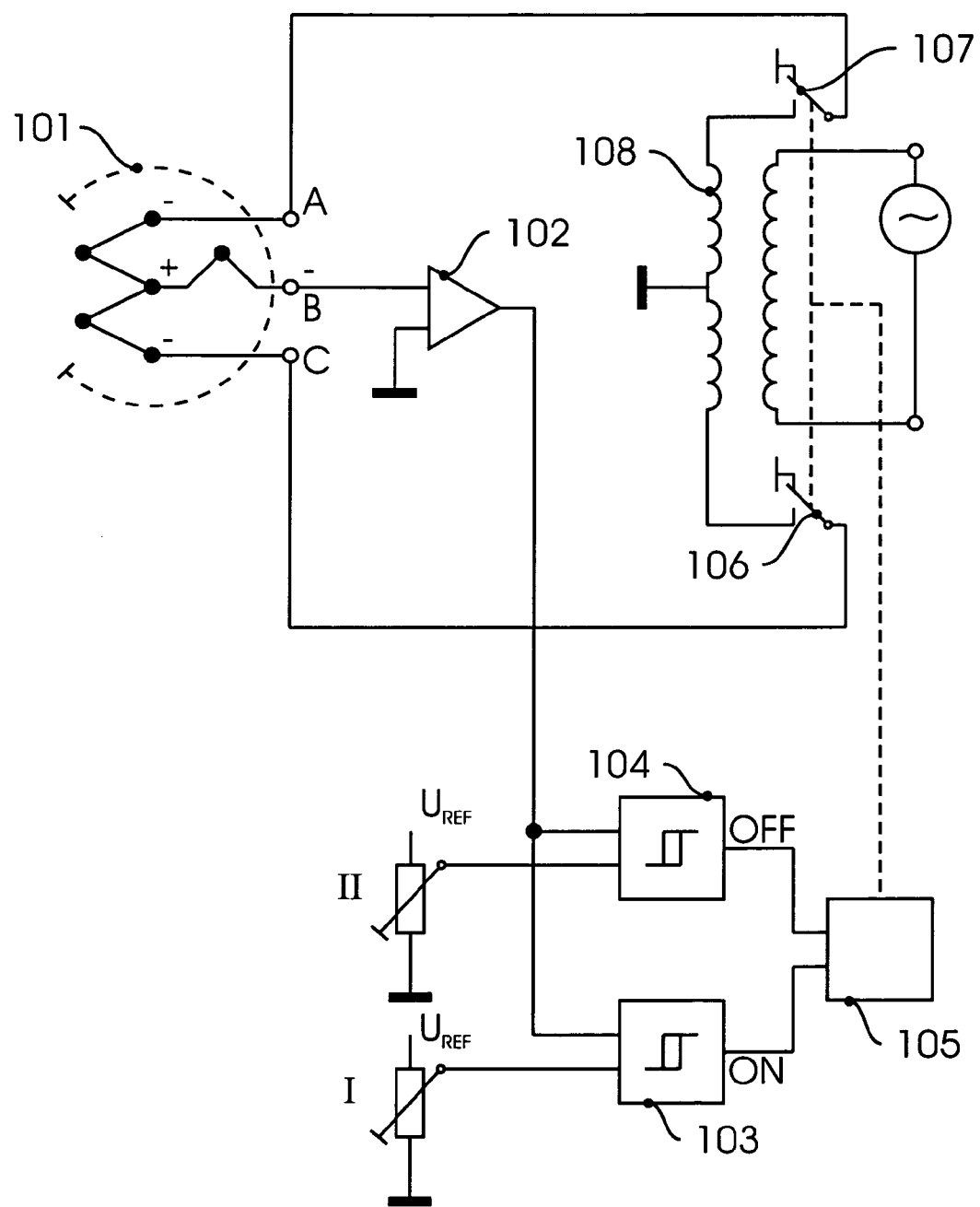
FIG. 1 shows a diagram of a thermocouple system in a vacuum measuring tube operatively connected to an operating circuit according to an aspect of the invention.

Referring to FIG. 1, a block diagram of an exemplary system in which the principles of the present invention may be advantageously practiced is illustrated generally. A thermocouple sensor 101, e.g. a commercially available vacuum measuring tube model DV-4 or DV-6 manufactured by Teledyne Hastings, is operatively connected to an operating circuit through connections A, B, and C. A variable temperature operating method is used wherein the temperature at the thermocouples continuously cycles between a lower threshold $\theta_I$ and an upper threshold $\theta_{II}$. This is achieved by modifying a traditional constant temperature sensor system such that an alternating heating voltage which is applied to a series connection of two thermocouples can be selectively turned on and off through switches 106 and 107.

In the exemplary circuit thermoelectric voltage output B is operatively connected to an amplifier 102. The output of amplifier 102 is connected in parallel to a first comparator 103 having switching threshold I, and to a second comparator 104 having switching threshold II. The outputs of comparators 103 and 104 are operatively connected to a logic circuit 105. Logic circuit 105 controls switches 106 and 107, which activate and deactivate the heating of thermocouple sensor 101. When the amplified thermoelectric voltage exceeds threshold II comparator 104 provides an "off" signal to logic circuit 105. Logic circuit 105 responsive to receiving the "off" signal controls switches 106 and 107 open. When switches 106 and 107 are opened heating voltage is removed from the thermocouple sensor 101 and thermocouple sensor 101 cools down.

When the amplified thermoelectric voltage falls below switching threshold I comparator 103 provides an "on" signal to logic circuit 105, which responsive thereto controls switches 106 and 107 to be closed. When switches 106 and 107 are closed heating current is applied from the secondary winding of transformer 108 to thermocouple sensor 101 which causes thermocouple sensor 101 to heat up. Alternating voltage is applied to the primary winding of transformer from an alternating voltage source.

Reference voltages I and II used in comparators 103 and 104 to establish switching thresholds I and II are adjustable using voltage dividers.

The electronic circuit as described causes a continuous heating-cooling cycle in which the temperature of the thermocouple sensor alternates between $\theta_I$ and $\theta_{II}$, said temperatures corresponding to switching threshold voltages I and II.

Figure 2A:
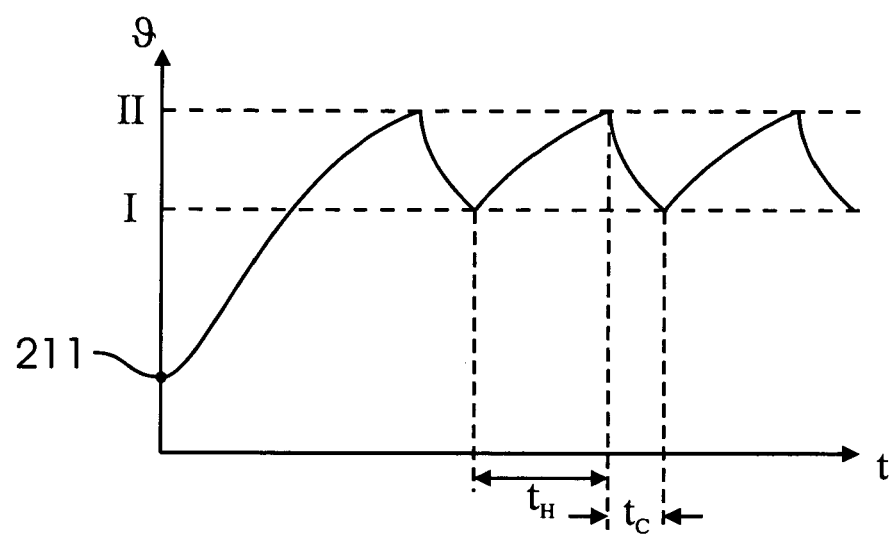
FIG. 2a and FIG. 2b illustrate exemplary temperature profiles of the thermocouple system as in FIG. 1 when operated at different pressure levels.
Figure 2B:
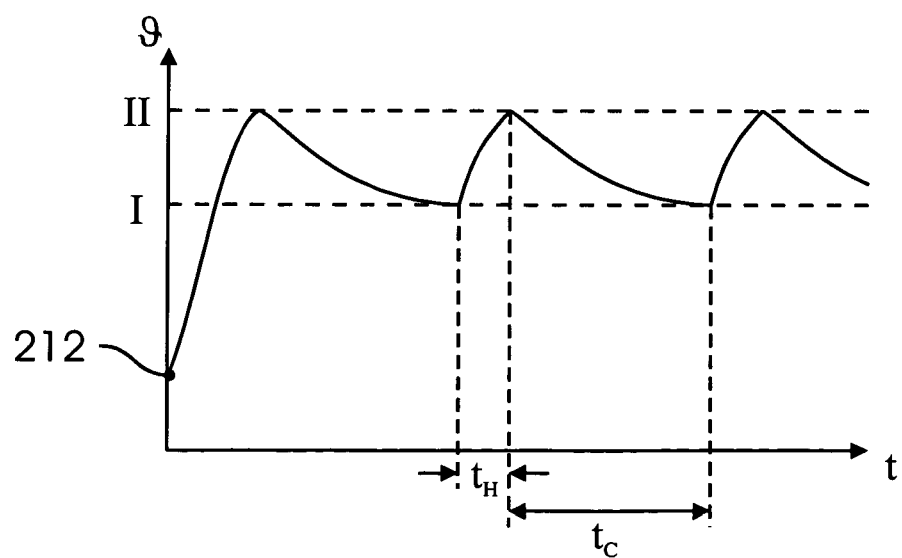

FIG. 2a and FIG. 2b show two exemplary temperature profiles for a measuring system as in FIG. 1. Beginning at a starting temperature 211, the thermocouple sensor is heated until its temperature reaches the upper temperature threshold $\theta_{II}$. The thermocouple sensor then cools off until it temperature reaches the lower temperature threshold $\theta_I$. The first measuring cycle begins when the temperature falls to $\theta_I$.

FIG. 2a illustrates an exemplary temperature profile typical for higher pressure. Due to the high heat capacity and high thermal conductivity of a gas at high pressure surrounding the thermocouple sensor, the temperature rises only slowly from threshold $\theta_I$ to $\theta_{II}$. It takes a time $t_{Ha}$ to heat the thermocouple sensor from temperature $\theta_I$ to $\theta_{II}$. Respectively, once the heating power to the thermocouple sensor is switched off, it cools off quickly due to high heat dissipation via the gas. The time to cool off from $\theta_I$ to $\theta_{II}$ is $t_{Ca}$.

In contrast, FIG. 2b illustrates an exemplary temperature profile typical for low pressure. Starting at the lower threshold temperature $\theta_I$ the thermocouple sensor when heated quickly reaches the upper threshold temperature $\theta_{II}$ after time $t_{Hb}$. However, at low pressure it takes the thermoelectric sensor a longer time $t_{Cb}$ to cool off than at higher pressure.

Thus, pressure in a partial vacuum can be determined by measuring either the heating time $t_H$, or the cooling time $t_C$, or both, and calculating the pressure as a function of $t_H$, or $t_C$, or both $t_H$ and $t_C$.

Figure 3A:
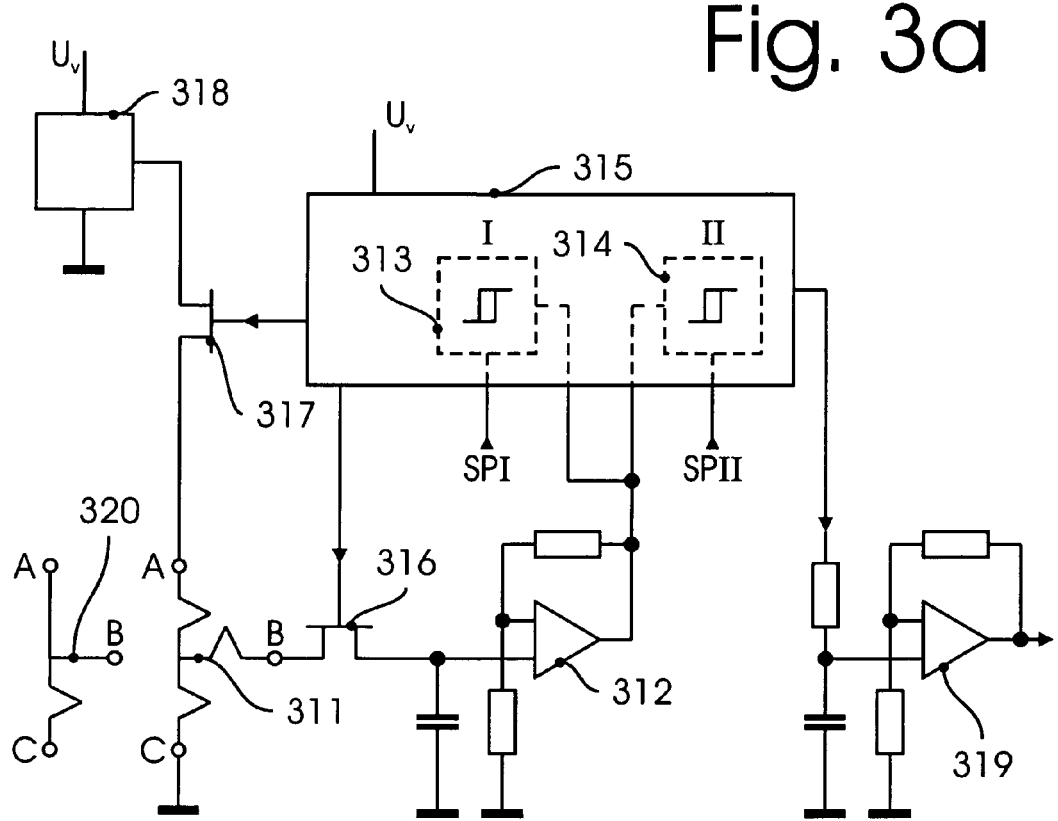
FIG. 3a shows an exemplary embodiment of an electronic circuit for operating the thermocouple system as in FIG. 1.
Figure 3B:
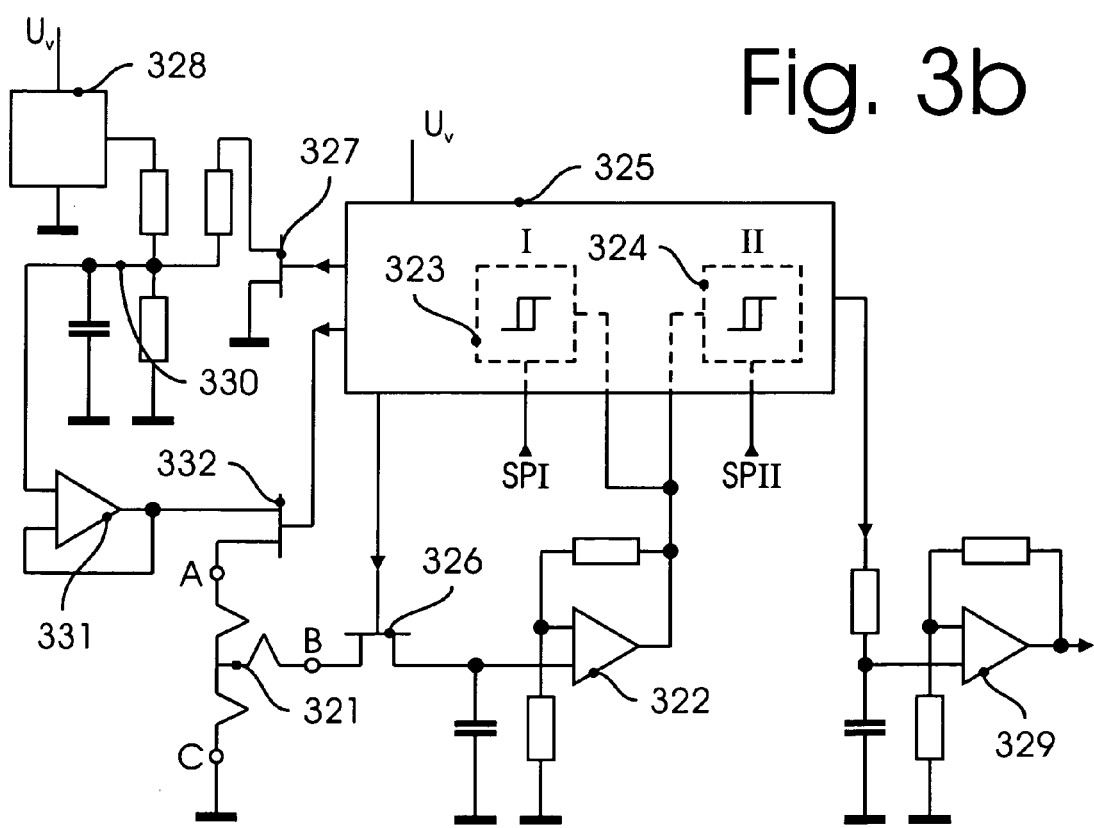
FIG. 3b shows an alternative embodiment of an electronic circuit for operating the thermocouple system as in FIG. 1.

FIG. 3a and FIG. 3b show two exemplary electronic circuits capable of generating temperature profiles as shown in FIG. 2a and FIG. 2b.

In the exemplary embodiment illustrated in FIG. 3a thermocouple sensor 311 or alternatively a single thermocouple 320 is connected to an electronic heating circuit comprising power source 318 and switch 317. The power source may deliver constant voltage or constant current or alternating voltage or alternating current. During a heating period switch 317 is pulsed on-off thereby generating heating pulses which raise the temperature of thermocouple sensor 311. Heating pulses generated during a heating period may be of equal duration throughout the heating period. Heating pulses may also change in duration over time, e.g. starting with a minimum pulse duration at the beginning of a heating cycle and gradually increasing to a maximum pulse duration at the end of a heating cycle.

During the off-time of the heating pulses, i.e. when switch 317 is open, switch 316 closes, thereby connecting thermocouple sensor 311 or 320 to a sample-and-hold-circuit having an amplifier 312. Switch 316 and the sample-and-hold circuit comprising amplifier 312, a capacitor and two resistors, form a voltage sensing circuit.

The output of amplifier 312 is connected to the inputs of comparators 313, which establishes the lower temperature threshold I, and 314, which establishes the upper temperature threshold II. Comparators 313 and 314 may be stand-alone components or integrated into a larger control device, e.g. into a microcontroller 315.

Microcontroller 315 processes the signals from the comparators and controls switch 317. Switch 317 is opened and closed in a pulse-like manner as long as the amplified thermoelectric voltage out of amplifier 312 has not yet reached the upper threshold II. Switch 317 is opened when the amplified thermoelectric voltage at amplifier 312 exceeds threshold II, and is not closed again until the thermoelectric voltage falls below threshold I.

One measuring cycle comprises a heating period during which the thermocouple sensor 311 or 320 is heated from a lower temperature threshold $\theta_I$ to an upper temperature threshold $\theta_{II}$, and a cooling period during which switch 317 is opened and the thermocouple sensor 311 or 320 cools off from temperature $\theta_{II}$ to $\theta_I$.

Microcontroller 315 may measure and store in memory any combination of following values indicative of the heating time: The number of heating pulses within a measuring cycle, the aggregated heating time of all heating pulses in a measuring cycle, and the total duration of the heating period. Microcontroller 315 may also measure and store the duration of the cooling period within a measuring cycle.

Microcontroller 315 may calculate the pressure of the partial vacuum surrounding thermocouple sensor 311 or 320 by comparing the heating time, or the cooling time, or both, with reference data stored in a memory associated with the microcontroller. The reference data may comprise data organized in tables, which have been populated using an initial calibration procedure. Microcontroller 315 may communicate the output of its pressure calculation as an analog voltage, e.g. by generating a pulse-width modulation (PWM) signal, which is smoothed using a low-pass filter and outputted via the output amplifier 319. Many other forms of communicating data from a microcontroller to another device are known and could be used, e.g. serial data communication such as a UART interface, parallel data communication, or wireless data communication.

FIG. 3b shows an alternative exemplary electronic circuit similar to that in FIG. 3a. Unlike FIG. 3a in which heating pulses to the thermocouple sensor 311 or 320 are provided by a constant voltage or constant current out of power supply 318 the circuit in FIG. 3b operates with a variable heating voltage or current. The heating voltage or current supplied to thermocouple sensor 321 ramps up over time during a measurement cycle, creating a pulsed sawtooth voltage profile at thermocouple sensor 321.

Power source 328 first supplies power to a resistor-capacitor combination 330. A switch 327 which opens and closes cyclically is controlled by the microcontroller 325. The saw tooth ramp thus generated is applied to the impedance transformer 331.

When switch 332 is momentarily closed by the microcontroller a heating pulse whose voltage level corresponds to the instantaneous value of the sawtooth ramp is generated. The switching-on time for the heating pulse at the switch 332 is much smaller than the time for which the switch 327 remains open. Switch 327 is open until SPI is reached.

The remaining components of circuit 3b operate equivalent to their counterparts in FIG. 3a. Switch 326 corresponds to switch 316, sample-and-hold circuit with amplifier 322 corresponds to 312, comparators 323 and 324 correspond to 313 and 314 and output amplifier 329 corresponds to 319.

Neither of the two electronic circuits shown in FIG. 3a and FIG. 3b requires use of an analog-to-digital converter. The microcontroller 315, 325 may communicate the measured pressure by selecting a duty cycle of its PWM output feeding into output amplified 319, 329. The duty cycle may be determined through a look-up-table or characteristic curve which associates heating and cooling times with a PWM output duty cycle.

Figure 4:
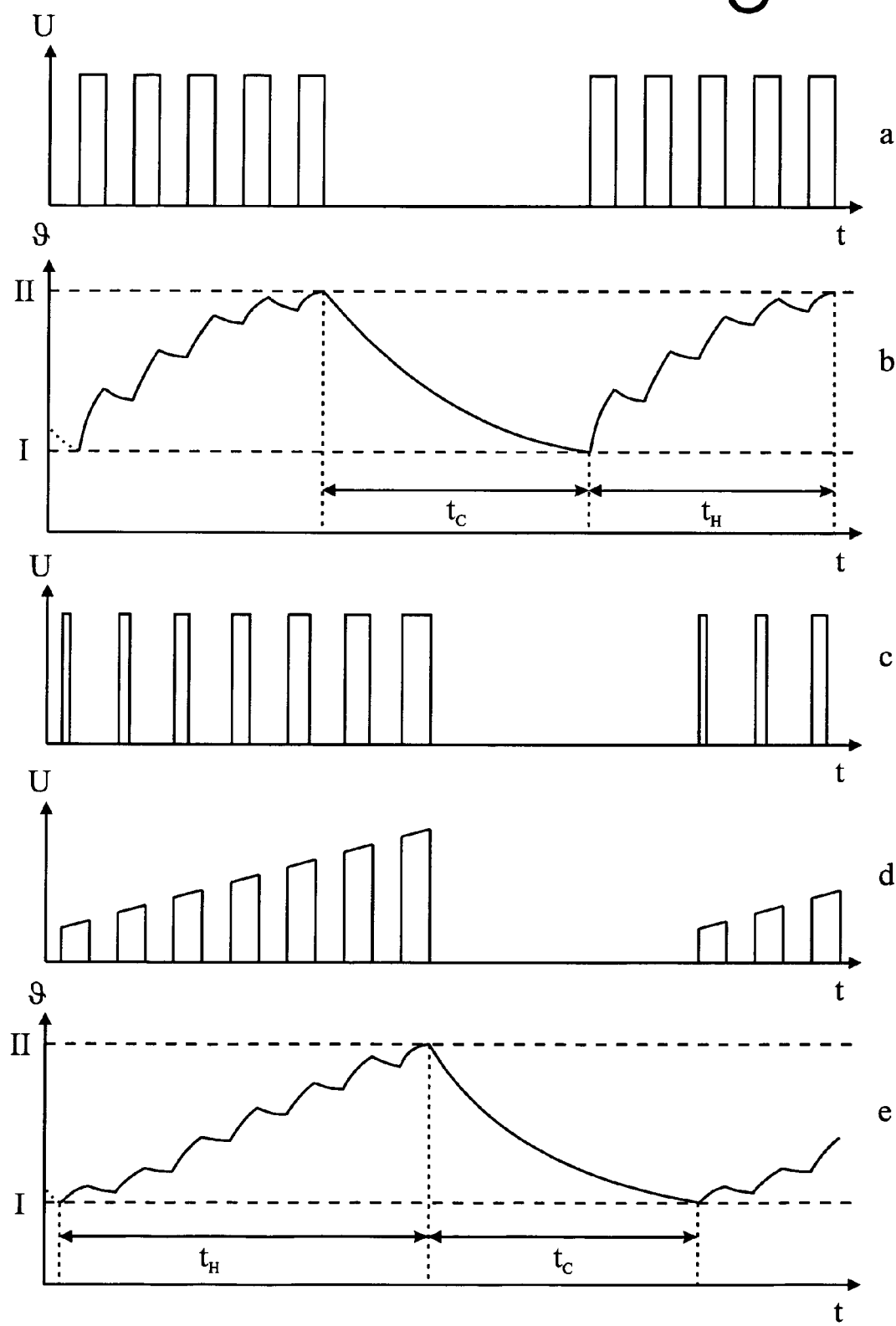
FIG. 4 illustrates alternative methods of operating a thermocouple vacuum measuring tube according to an aspect of the invention, showing voltages applied to the thermocouple and the resulting temperatures of the thermocouple over time.

FIG. 4 shows exemplary pulse shape diagrams and temperature curves generated by the two electronic circuits according to FIG. 3a and FIG. 3b.

FIG. 4a shows an exemplary diagram of voltage over time that is applied to the thermocouple sensor. As shown the heating pulses have a constant pulse length and a constant voltage level. The corresponding temperature of the thermocouple sensor over time is illustrated in FIG. 4b. As shown the temperature cycles between the lower threshold temperature $\theta_I$ and the upper temperature threshold $\theta_{II}$.

FIG. 4c shows an alternative diagram of voltage over time that is applied to the thermocouple sensor. As illustrated the length of the heating pulses continuously increases throughout the heating period.

FIG. 4d shows an exemplary diagram of voltage over time that may be generated by the electronic circuit illustrated in FIG. 3b. Here the voltage of each heating pulse increases throughout the heating period following sawtooth ramp.

The heating pulses illustrated in both FIG. 4c and FIG. 4d may cause a temperature profile of the thermocouple sensor over time as shown in FIG. 4e. Early in the heating period the temperature of the thermocouple sensor rises slower when pulses shown in FIG. 4c or FIG. 4d are used than when pulses as in FIG. 4a are used. This is because the average power applied to the thermocouple sensor by heating pulses 4c or 4d in the early heating phase is lower than that by heating pulses 4a. The total heating time using heating pulses 4c or 4d is longer than the total heating time using pulses 4a. A longer heating time is advantageous in particular at low pressure as it increases the resolution of the time measurement at a given microcontroller operating frequency.

Microcontroller 315, 325 may have an associated data memory in which tables are stored, which for typical thermocouple sensors are determined in a one-time basic calibration procedure. In these tables an additional time for a PWM output pulse (for a constant pause time of the PWM signal) or, for each time, for a PWM output pulse and for a pause in the PWM output signal, is associated with the measured time interval.

The characteristic line or look-up table in microcontroller 315, 325 which determined the controller's PWM output as a function of the measured heating time, cooling time, or both, may be manually calibrated, e.g. through one of more calibration switches operatively connected to the microcontroller. Also, predetermined calibrations for known mass-produced thermocouple sensors may be stored in the micro controller's memory.

Manual calibration may also be used to compensate aging, e.g. caused by deposits formed on a thermocouple sensor. For this purpose it is necessary to store only one time interval each (heating time, cooling time), which is determined by the circuit in a first keystroke and a first (upper) reference pressure, and a second keystroke at a second (lower) reference pressure, in a memory which is associated with the corresponding table. If no calibrated comparison instruments are available for the reference pressure, it is also possible for a pressure above the higher measurement range limit (first reference pressure), to adjust to the higher measurement range limit, and for a pressure less than the lower measurement range limit (second reference pressure), to adjust to the lower measurement range limit.

While the present invention has been described with reference to exemplary embodiments, it will be readily apparent to those skilled in the art that the invention is not limited to the disclosed or illustrated embodiments but, on the contrary, is intended to cover numerous other modifications, substitutions, variations and broad equivalent arrangements that are included within the spirit and scope of the following claims.

What is claimed is:

1. A system for measuring pressure in a partial vacuum comprising:
    a thermocouple sensor located within the partial vacuum, the thermocouple sensor comprising at least one thermocouple which generates a thermoelectric voltage;
    a heating circuit operatively connected to the thermocouple sensor, the heating circuit being configured to apply heating pulses to the thermocouple sensor;
    a voltage sensing circuit operatively connected to the thermocouple sensor, the voltage sensing circuit being configured to measure the thermoelectric voltage generated by the at least one thermocouple;
    a control processor operatively connected to the voltage sensing circuit and the heating circuit, wherein the control processor
        enables heating pulses during a heating period when the thermoelectric voltage is below a lower threshold and keeps the heating pulses enabled until the thermoelectric voltage exceeds an upper threshold;
        disables heating pulses during a cooling period when the thermoelectric voltage exceeds the upper threshold and keeps the heating pulses disabled until the thermoelectric voltage falls below the lower threshold;
        measures the duration of the heating period, or the cooling period, or both;
        determines the pressure of the partial vacuum as a function of the duration of the heating period, or the duration of the cooling period, or both.

2. A system for measuring pressure in a partial vacuum as in claim 1, wherein the duration of the heating period is measured by any combination of the following:
    a) counting the number of heating pulses within a measuring cycle;
    b) recording the aggregated heating time of all heating pulses in a measuring cycle;
    c) recording the total duration of the heating period.

3. A system for measuring pressure in a partial vacuum as in claim 1, wherein the power of heating pulses applied to the thermocouple sensor increases over time throughout the heating period.

4. A system for measuring pressure in a partial vacuum as in claim 1, further comprising a memory operatively connected to the control processor, wherein stored in the memory is data associating the duration of a heating period or the duration of a cooling period with the pressure of the partial vacuum.

5. An electronic circuit for measuring the pressure of a partial vacuum surrounding a thermocouple sensor comprising:
    an amplifier configured to amplify a thermoelectric voltage generated by the thermocouple sensor;
    a first comparator configured to compare the amplified thermoelectric voltage against a lower voltage threshold;
    a second comparator configured to compare the amplified thermoelectric voltage against an upper voltage threshold;
    a switch configured to turn on and turn off heating to the thermocouple sensor;
    wherein the heating is turned on responsive to a signal from the first comparator indicating that the amplified thermoelectric voltage is below the lower voltage threshold, and the heating is turned off responsive to a signal from the second comparator indicating that the amplified thermoelectric voltage is above the upper voltage threshold.

6. The electronic circuit as in claim 5, further comprising:
    a time measuring circuit configured to measure at least one of
    a) the duration of a heating period during which heating to the thermocouple sensor is turned on, and
    b) the duration of a cooling period during which heating to the thermocouple sensor is turned off.

7. The electronic circuit as in claim 6, further comprising:
    a processor configured to provide a signal indicative of the pressure surrounding the thermocouple sensor as a function of the duration of the heating period, or the duration of the cooling period, or both.

8. The electronic circuit as in claim 7, further comprising a memory operatively connected to the processor, wherein the pressure signal generated by the processor is calculated using data stored in the memory, the data being characteristic of the relationship of the duration of the heating period or the duration of the cooling period and the pressure surrounding the thermocouple sensor.

9. The electronic circuit as in claim 8, wherein said characteristic data is organized as look-up table or a characteristic line.

10. The electronic circuit as in claim 7, wherein the pressure signal is provided as a pulse-width modulated signal.

11. The electronic circuit as in claim 6, wherein the power applied to the thermocouple sensor during a heating period increases over time.

12. The electronic circuit as in claim 5, wherein the heating consists of applying electric power pulses to the thermocouple sensor.

13. The electronic circuit as in claim 12, wherein the power applied to the thermocouple sensor is modulated by alternating the duty cycle, or the amplitude of the power pulses applied to the thermocouple sensor.

14. A method for measuring pressure at partial vacuum comprising the steps of:
   (a) providing an electrically generated heating current to a thermocouple sensor which alternates between an on state and an off state;
   (b) measuring a thermoelectric voltage generated by the thermocouple sensor;
   (c) comparing the thermoelectric voltage to a first and a second reference signal;
   (d) varying the heating current so as to cause the thermoelectric voltage to cycle between the first and the second reference signal;
   (e) measuring at least one of the rise time and the fall time of the thermoelectric voltage within a cycle; and
   (f) determining the pressure at the partial vacuum as a function of the measured rise time or fall time or both.

15. A method for operating a thermocouple sensor in partial vacuum comprising the steps of
   (a) alternately heating the thermocouple sensor from a lower threshold temperature to an upper threshold temperature and
   (b) cooling the thermocouple sensor from the upper threshold temperature to the lower threshold temperature and
   (c) determining the pressure in the partial vacuum as a function of the time required to complete step a) or step b).

* * * * *